United States Patent
Lee

(10) Patent No.: US 8,243,223 B2
(45) Date of Patent: Aug. 14, 2012

(54) LIQUID CRYSTAL DISPLAY DEVICE

(75) Inventor: Sang-Soo Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 291 days.

(21) Appl. No.: 12/649,892

(22) Filed: Dec. 30, 2009

(65) Prior Publication Data

US 2010/0289979 A1 Nov. 18, 2010

(30) Foreign Application Priority Data

May 15, 2009 (KR) .................. 10-2009-0042808

(51) Int. Cl.
*G02F 1/1333* (2006.01)
(52) U.S. Cl. ....................................................... 349/58
(58) Field of Classification Search ...................... 349/58
See application file for complete search history.

(56) References Cited

U.S. PATENT DOCUMENTS

| | | | |
|---|---|---|---|
| 6,552,761 B1* | 4/2003 | Seo et al. | 349/58 |
| 7,626,747 B2* | 12/2009 | Murakata | 359/245 |
| 7,639,315 B2* | 12/2009 | Kao | 349/58 |
| 2005/0062902 A1* | 3/2005 | Fukayama | 349/58 |
| 2009/0046217 A1* | 2/2009 | Fukayama | 349/58 |
| 2009/0153766 A1* | 6/2009 | Lee et al. | 349/58 |
| 2009/0161345 A1* | 6/2009 | Hsu et al. | 362/97.2 |
| 2010/0060817 A1* | 3/2010 | Park et al. | 349/64 |
| 2010/0079699 A1* | 4/2010 | Cho et al. | 349/61 |

* cited by examiner

*Primary Examiner* — Timothy L Rude
(74) *Attorney, Agent, or Firm* — Morgan, Lewis & Bockius LLP

(57) ABSTRACT

A liquid crystal display device includes a liquid crystal panel; a backlight unit disposed under the liquid crystal panel and including a light source and an optical sheet, the optical sheet including a protrusion extending from two opposite sides; and a bottom frame under the backlight unit and including a counter part, the counter part including an opening such that the protrusion is inserted into the opening.

11 Claims, 4 Drawing Sheets

LIQUID CRYSTAL DISPLAY DEVICE

The present application claims the benefit of Korean Patent Application No. 10-2009-0042808 filed in Korea on May 15, 2009, which is hereby incorporated by reference.

BACKGROUND OF THE INVENTION

1. Field of the Invention

The present invention relates to a liquid crystal display (LCD) device and more particularly to an LCD device being capable of fixing an optical sheet.

2. Discussion of the Related Art

As information technology and mobile communication technology have been developed, a display device being capable of displaying a visual image has also been developed. The display device is classified into a projection type and a direct type. The direct type display device is also classified into a self-emission type and non-emission type. For example, the liquid crystal display device is classified into the non-emission type display device.

Since the LCD device does not include a light source therein, an additional light source is required. For example, a backlight unit including a lamp is disposed under a liquid crystal panel to provide light onto the liquid crystal panel. The LCD device can display images using the light from the backlight unit.

Generally, the backlight unit is classified into a side type and a direct type depending on a position of the light source. In the side type backlight unit, the light source is positioned at a side of the backlight unit. The light from the light source in the side type backlight unit is refracted by a light guide plate to proceed to the liquid crystal panel. On the other hand, in the direct type backlight unit, the light source is positioned at a center of the backlight unit such that the light from the light source is directly provided to the liquid crystal panel.

FIG. 1 is a cross-sectional view of the related art LCD. In FIG. 1, the LCD includes a liquid crystal panel 10, a backlight unit 20, a main frame 30, a top frame 40 and a bottom frame 50.

The liquid crystal panel 10 is a major element for displaying images. The liquid crystal panel 10 includes a first substrate 12, a second substrate 14 and a liquid crystal layer (not shown). The first and second substrates 12 and 14 face each other, and the liquid crystal layer is interposed therebetween.

The backlight unit 20 is disposed under the liquid crystal panel 10. The backlight unit 20 includes a lamp 24 as a light source, a lamp guide 25 for guiding the lamp 24, a reflective sheet 22, a light guide plate 26 and an optical sheet 28. The lamp 24 is arranged along at least one side of the main frame 30. The reflective sheet 22 is disposed on the bottom frame 50 and has a color of white or silver. The light guide plate 26 is disposed on the reflective sheet 22, and the optical sheet 28 is disposed on or over the light guide plate 26.

The liquid crystal display panel 10 and the backlight unit 20 are combined using the main frame 30 that can prevent movement of the liquid crystal panel 10 and the backlight unit 20. The top frame 40 cover edges of the liquid crystal panel 10 and sides of the main frame 30, so the top frame 40 can support and protect of the edges of the liquid crystal panel 10 and sides of the main frame 30. The bottom frame 50 covers back edges of the main frame 30, so the bottom frame 50 is combined with the main frame 30 and the top frame 40 for modulation.

The optical sheet 28 is disposed on the light guide plate a special fixing member such that there is movement of the optical sheet 28. As a result, the optical sheet 28 may go out of a desired position. In this case, there are damages on the optical sheet 28 when the main frame 30 and the bottom frame 50 are modulated. Since the LCD display can not display an uniform image because of the damaged optical sheet 28, a production yield is decreased.

SUMMARY OF THE INVENTION

Accordingly, the present invention is directed to an LCD device that substantially obviate one or more of the problems due to limitations and disadvantages of the related art.

An object of the present invention is to provide an LCD device being capable of fixing an optical sheet.

Another object of the present invention is to provide an LCD device being capable of displaying high quality images.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes a liquid crystal panel; a backlight unit disposed under the liquid crystal panel and including a light source and an optical sheet, the optical sheet including a protrusion extending from two opposite sides; and a bottom frame under the backlight unit and including a counter part, the counter part including an opening such that the protrusion is inserted into the opening.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments, examples of which are illustrated in the accompanying drawings.

Figure 1:
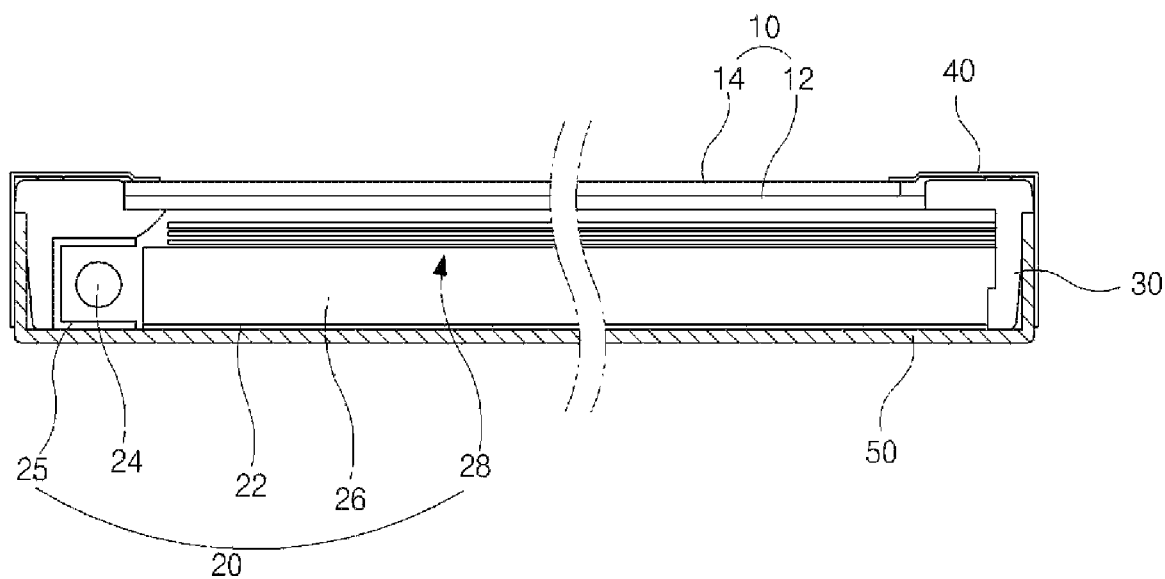
FIG. 1 is a schematic exploded perspective view of the related art LCD device.
Figure 2:
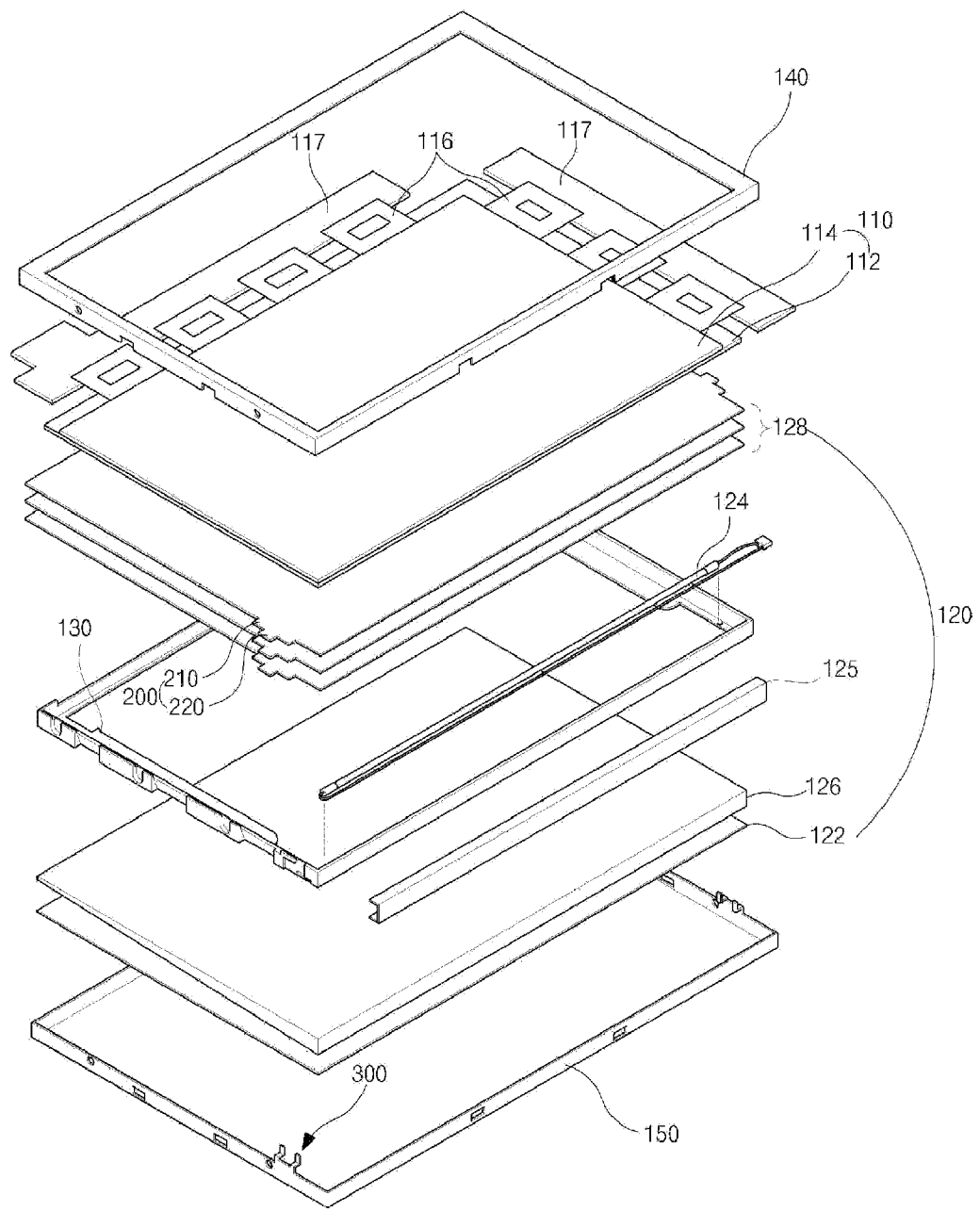
FIG. 2 is a schematic exploded perspective view of an LCD device according to the present invention.

FIG. 2 is a schematic exploded perspective view of an LCD device according to the present invention. In FIG. 2, an LCD device includes a liquid crystal panel 110, a backlight unit 120, a main frame 130, a top frame 140 and a bottom frame 150.

The liquid crystal panel 110 includes a first substrate 112, a second substrate 114 and a liquid crystal layer (not shown). The first and second substrates 112 and 114 face each other, and the liquid crystal layer is interposed therebetween. Assuming the liquid crystal panel 110 is driven by an active matrix type, a gate line (not shown) and a data line (not shown) are formed on the first substrate 112. The gate and data lines cross each other to define a pixel. A thin film transistor (TFT) (not shown) is also formed on the first substrate 112 and positioned at a crossing portion of the gate and data lines. In addition, a pixel electrode (not shown) is positioned in each pixel and connected to the pixel electrode. The first substrate 112 may be called as an array substrate. On the other hand, red, green and blue color filters (not shown) are formed on the second substrate 114. In addition, a black matrix (not shown) for shielding the gate and data lines and the TFT and a common electrode for generating an electric field with the pixel electrode are formed on the second substrate 114. The second substrate 114 may be called as a color filter substrate.

A polarizing plate for selectively transmitting light is formed on an outer surface of each of the first and second substrates 112 and 114. A printed circuit board (PCB) 117 is connected to one side of the liquid crystal panel 110 via a connection member 116, for example, a tape carrier package. The PCB 117 is bent along a side surface of the main frame 130 or a rear surface of the bottom frame 150 during a modulation process of the LCD device.

When the TFT is turned on by a signal, which is applied to the TFT through the gate line and generated from a gate driving circuit, a signal voltage from a data driving circuit is supplied to the pixel electrode through the data line. An arrangement of liquid crystal molecules are controlled by an electric field induced between the pixel and common electrode to change transmittance.

The backlight unit 120 is disposed under the liquid crystal panel 110 such that light is provided onto the liquid crystal panel 110. The backlight unit 120 includes a lamp 124 as a light source, a reflective sheet 122, a light guide plate 126 and an optical sheet 128. The lamp 124 is arranged along at least one side of the main frame 130. The reflective sheet 122 is disposed under the light guide plate 126 and has a color of white or silver. The light guide plate 126 is disposed on the reflective sheet 122, and the optical sheet 128 is disposed on or over the light guide plate 126. One of a cold cathode fluorescent lamp (CCFL), an external electrode fluorescent lamp (EEFL) and a light emitting diode (LED) is used as a lamp 124. A lamp guide may be required for the CCFL or EEFL. The lamp guide may be not required for the LED. A side of the lamp guide facing the light guide plate 126 is opened, and other portions of the lamp guide covering the lamp 124. The lamp guide protects the lamp 124 and light from the lamp 124 is concentrated to the light guide plate 126 due to the lamp guide.

The light from the lamp 124 is diffused and process to a plane light source by a total reflection through the light guide plate 126. The light guide plate 126 may includes a pattern on a rear surface of the light guide plate 126 to improve an uniformity of the light. The pattern of the light guide plate 126 may be one of an elliptical shape, a polygonal shape and a hologram shape. The pattern is formed by a printing method or an injection molding method.

The reflective sheet 122 is disposed at a rear side of the light guide plate 126 and reflects the light to provide the liquid crystal panel 110 such that light brightness is improved. The optical sheet 128 on the light guide plate 126 includes one diffusion sheet and at least one light concentration sheet. The diffusion sheet is disposed directly on the light guide plate 126. the diffusion sheet diffuses the light through the light guide plate 126 and controls a light direction such that the light is provided to the concentration sheet. The diffused light by the diffusion sheet is concentrated by the light concentration sheet to have a substantially vertical direction to the liquid crystal display panel 110.

The optical sheet 128 has a rectangular shape and includes a protrusion 200 at two opposite sides. The protrusion 200 is formed on each the diffusion sheet and the light concentration sheets. The protrusion 200 is positioned at an edge of each of the two opposite sides. Alternatively, the protrusion 200 may be positioned at a center of each of the two opposite sides. A position of the protrusion 200 at one side corresponds to the protrusion 200 at the other side. Alternatively, the protrusion 200 at one side may be positioned in a diagonal direction from the protrusion at the other side. The protrusion 200 includes a first protruding part 210 and a second protruding part 220. The first protruding part 210 extends from the optical sheet 128, and the second protruding part 220 extends from the first protruding part 210. A width of the first protruding part 210 is smaller than that of the optical sheet 128 and larger than that of the second protruding part 220.

The liquid crystal panel 110 and the backlight unit 120 are modulated with the main frame 130, the top frame 140 and the bottom frame 150. The top frame 140 covers edges of a front surface of the liquid crystal panel 110 and side surfaces of the liquid crystal panel 110. The top frame 140 has an opening such that images from the liquid crystal panel 110 can be displayed through the opening of the top frame 140. The main frame 130 has a rectangular frame shape. The main frame 130 covers side surfaces of the liquid crystal panel 110 and the backlight unit 120 and is combined with the top frame 140 and the bottom frame 150. The bottom frame 150 includes a bottom surface and four side surfaces to cover a rear surface of the backlight unit 120 and side surfaces of the backlight unit 120. The above backlight unit 120 may be called as a side light type. Namely, the lamp 124 is arranged along one side of the main frame 130. The lamp 124 may be further arranged along an opposite side of the main frame 130. In an LCD device including this backlight unit, there are the protrusion and the counter part such that the movement of the optical sheet is prevented.

Figure 3:
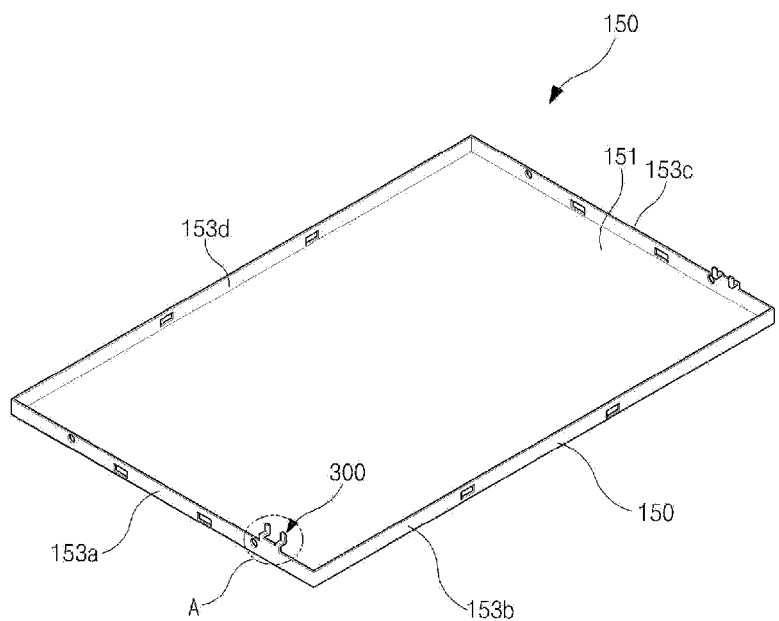
FIG. 3 is a schematic perspective view of a bottom frame according to the present invention.

A counter part 300 is formed at two opposite side surfaces of the bottom frame 150. The counter part 300 corresponds to the protrusion 200 of the optical sheet 128. The movement of the optical sheet 128 is prevented due to the protrusion 200 and the counter part 300. Namely, the protrusion 200 is inserted into an opening of the counter part 300. This is explained in more detail with reference to FIGS. 3 and 4. FIG. 3 is a schematic perspective view of a bottom frame according to the present invention, and FIG. 4 is an enlarged view of an "A" portion in FIG. 3.

In FIG. 3, the bottom frame 150 includes a bottom surface 151 and first to fourth side surfaces 153a, 153b, 153c and 153d. The bottom surface 151 covers the rear surface of the backlight unit 120, and the first to fourth side surfaces 153a to 153d covers the side surface of the backlight unit 120. The bottom surface 151 has a rectangular plate shape. The first to fourth side surfaces 153a to 153d vertically extend from the bottom surfaces 151 to provide a space. The backlight unit 120 is disposed in the space. The counter part 300 is positioned at each of the first and third side surfaces 153a and 153c facing each other. A position of the counter part 300 in the first and third surface 153a and 153c may be changed according to a position of the protrusion 200 of the optical sheet 128. The protrusion 200 is inserted into an opening of the counter part 300 such that the movement of the optical sheet 128 is prevented.

Figure 4:
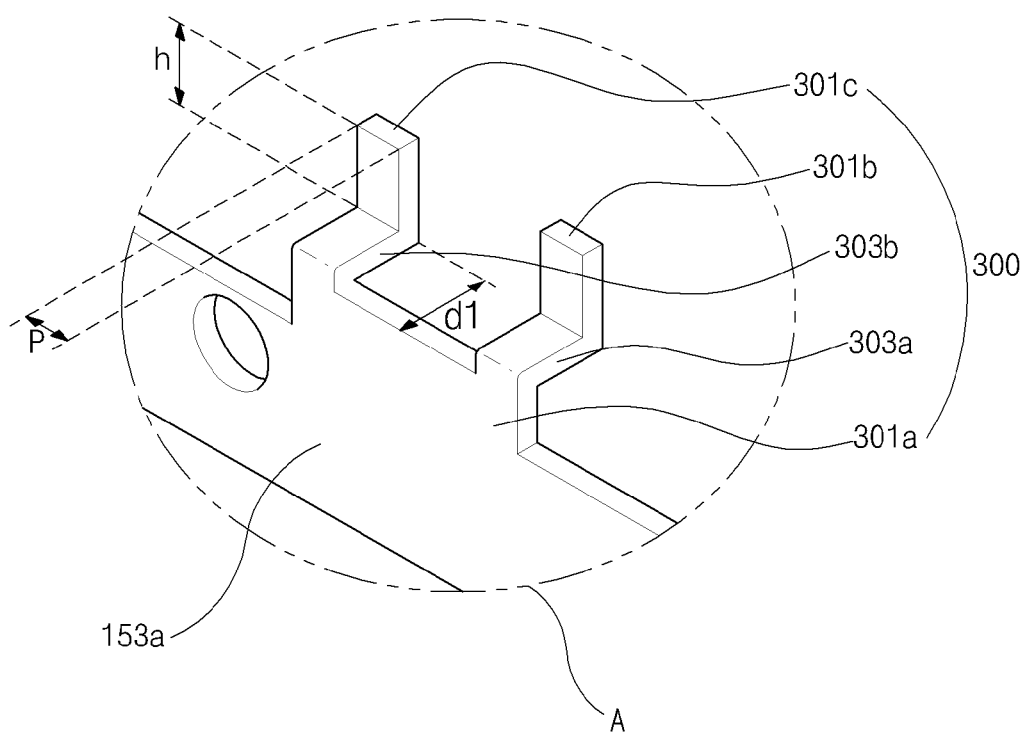
FIG. 4 is an enlarged view of an "A" portion in FIG. 3.

In FIG. 4, the counter part 300 includes first to third vertical parts 301a, 301b and 301c and first and second horizontal parts 303a and 303b. The first vertical part 301a extends from the first side surface 153a of the bottom frame 150 to be substantially parallel to the first side surface 153a, and the first and second horizontal parts 303a and 303b extends from the first vertical part 301a to be substantially parallel to both ends of the bottom surface 151 and vertical to the first vertical part 301a. The first and second horizontal parts 303a and 303b are spaced apart from each other such that the first vertical part 301a and the first and second horizontal parts 303a and 303b have a fork shape. The second and third vertical parts 301b and 301c respectively extend from the first and second horizontal parts 303a and 303b to be substantially parallel to the first vertical par 301a. Each of the second and third vertical parts 301b and 301c do not face the first vertical part 301a. Since the first and second horizontal parts 303a and 303b are spaced apart from each other and the second and third vertical parts 301b and 301c are spaced apart from each other, there is an opening where the protrusion 200 of the optical sheet 128 is inserted. Another counter part 300 at the third side surface 153c of the bottom frame 150 has substantially the same shape as the counter part 300 at the first side surface 153a of the bottom frame 150.

A length "d1" of each of the first and second horizontal parts 303a and 303b is substantially equal to a length of the second protruding part 220 of the optical sheet 128, and a height "h" of each of the second and third vertical parts 301b and 301c is about 1.2 times of a thickness of the optical sheet 128. As mentioned above, the movement of the optical sheet 128 is prevented due to the protrusion 200 and the counter part 300.

Figure 5:
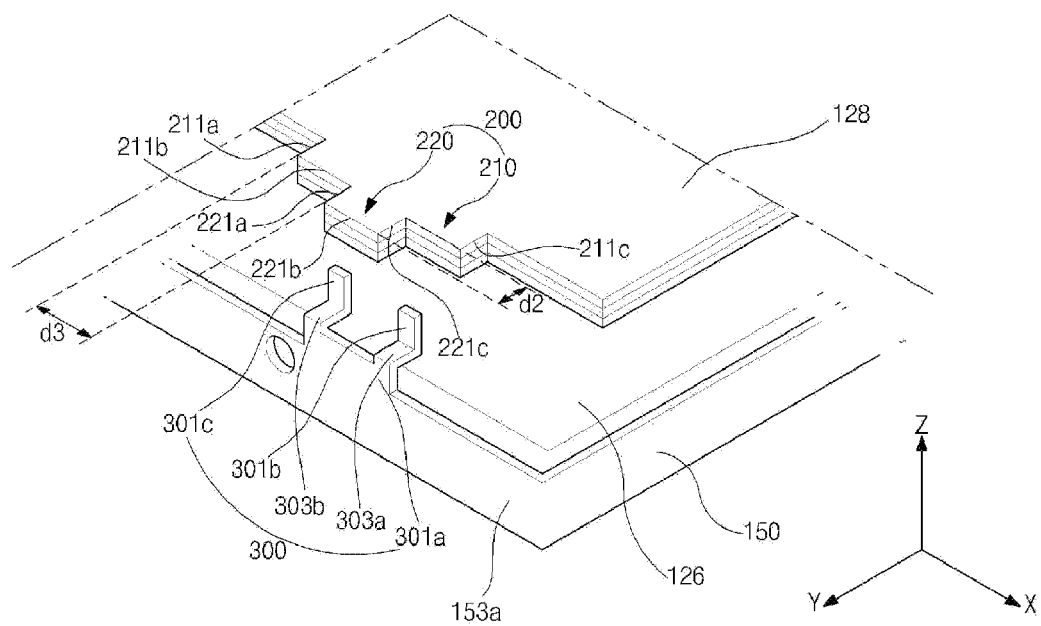
FIG. 5 is a schematic view showing an optical sheet combined with a bottom frame according to the present invention.

FIG. 5 is a schematic view showing an optical sheet combined with a bottom frame according to the present invention. In FIG. 5, the counter part 300, which includes the first vertical part 301a extending from the first side surface 153a, the first and second horizontal parts 303a and 303b respectively extending from both ends of the first vertical part 301a, and the second and third vertical parts 301b and 301c respectively extending from the first and second horizontal parts 303a and 303b, is formed at the first side surface 153a of the bottom frame 151. Although not shown in FIG. 5, another counter part is formed at the third side surface 153c facing the first side surface 153a. The backlight unit 120 is disposed in a space of the bottom frame 150. Namely, the reflective sheet 122, the light guide plate 126 and the optical sheet 128 are stacked on the bottom surface of the bottom frame 150. The protrusion 200 is formed at two opposite sides of the optical sheet 128. The protrusion 200 includes the first protruding part 210 and the second protruding part 220. A width of the second protruding part 220 is smaller than that of the first protruding part 210. A position of the protrusion 200 corresponds to that of the counter part 300.

The first protruding part 210 extends from the optical sheet 128 in the same plane as the optical sheet 128. The first protruding part 210 includes first to third sides 211a, 211b and 211c. Each of the first and third sides 211a and 211c extend from the optical sheet 128, and the second side 211b extends from each of the first and third sides 211a and 211c. The second protruding part 220 extends from the first protruding part 210 in the same plane as the first protruding part 210 and includes fourth to sixth sides 221a, 221b and 221c. The fourth and sixth sides 221a and 221c extend from the second side 211b to be vertical to the second side 211b, and the fifth side 221c connects the fourth and sixth sides 221a and 221c. Namely, the optical sheet 128 including the protrusion 200 has a flat topped pyramid shape in a side view. Since the protrusion 200 of the optical sheet 128 is inserted into an opening of the counter part 300 of the bottom frame 150 during a modulation process, the movement along X and Y directions of the optical sheet 128 is efficiently prevented.

The second side 211b of the first protruding part 210 is supported by the second and third vertical parts 301b and 301c of the counter part 300, and the fourth and sixth sides 221a and 221c of the second protruding part 220 are supported by the first and second horizontal parts 303a and 303b of the counter part 300. Namely, the movement of the optical sheet 128 along the Y direction is prevented by the second and third vertical parts 301b and 301c, and the movement of the optical sheet 128 along the X direction is prevented by the second and third vertical parts 301b and 301c and the first and second horizontal parts 303a and 303b.

A length "d2" of the second protruding part 220 is equal to the length "d1" of the first and second horizontal parts 303a and 303b. Alternatively, the length "d2" of the second protruding part 220 may be larger than the length "d1" of the first and second horizontal parts 303a and 303b. A length "d3" of the second side 211b at one side of the second protruding part 210 is larger than a width "p" of each of the first and second horizontal parts 303a and 303b. By the above structure, the movement of the optical sheet 128 is efficiently prevented and a position of the optical sheet 128 is fixed in the LCD device.

Figure 6:
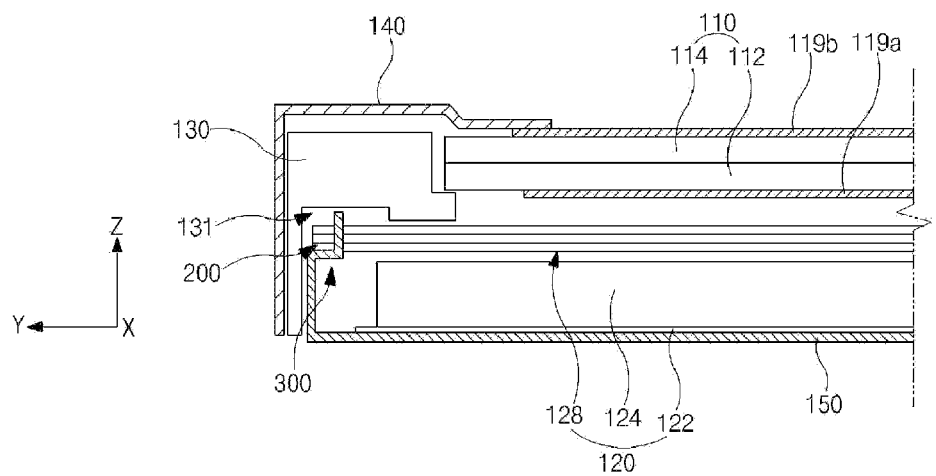
FIG. 6 is a schematic cross-sectional view of an LCD device according to the present invention.

Referring FIG. 6, which is a schematic cross-sectional view of an LCD device according to the present invention, the LCD device includes a liquid crystal panel 110, a backlight unit 120, a main frame 130, a top frame 140 and a bottom frame 150. The liquid crystal panel 110 includes a first substrate 112, a second substrate 114 and a liquid crystal layer (not shown). The first and second substrates 112 and 114 face each other, and the liquid crystal layer is interposed therebetween. First and second polarizing plates 119a and 119b are formed at outer sides of the first and second substrates 112 and 114, respectively. The backlight unit 120 is disposed under the liquid crystal panel 110 such that light is provided onto the liquid crystal panel 110. The liquid crystal panel 110 and the backlight unit 120 are modulated with the main frame 130, the top frame 140 and the bottom frame 150. The top frame 140 covers edges of a front surface of the liquid crystal panel 110 and side surfaces of the liquid crystal panel 110. The top frame 140 has an opening such that images from the liquid crystal panel 110 can be displayed through the opening of the top frame 140. The main frame 130 covers side surfaces of the liquid crystal panel 110 and the backlight unit 120 and is combined with the top frame 140 and the bottom frame 150. The bottom frame 150 covers a rear surface of the backlight unit 120.

The backlight unit 120 includes a lamp 124 (of FIG. 2) as a light source, a reflective sheet 122, a light guide plate 126 and an optical sheet 128. The lamp 124 is arranged along at least one side of the main frame 130. The reflective sheet 122 is disposed under the light guide plate 126. The light guide plate 126 is disposed on the reflective sheet 122, and the optical sheet 128 is disposed on or over the light guide plate 126. The backlight unit 120 may further include a lamp guide (not shown) for guiding the lamp 124.

The protrusion 200 is formed at two opposite sides of the optical sheet 128, and the counter part 300 is formed at two opposite side surfaces of the bottom frame 150. The protrusion 200 is inserted into the counter part 300 such that the movement of the optical sheet 128 along the X and Y directions is prevented. In addition, the main frame 130 covers edges of the optical sheet 128 such that the movement of the optical sheet 128 along the Z direction is also prevented. The main frame 130 has a concave portion 131, which corresponds to the counter part 300, such that the second and third vertical parts 301b and 301c of the counter part 300 is inserted into the concave portion 131.

A modulation process of the LCD device according to the present invention is explained below.

The backlight unit 120 is disposed on the bottom surface 151 of the bottom frame 150. Namely, the backlight unit 120 is disposed in the space defined by the bottom surface 151 and the first to fourth side surfaces 153a to 153d of the bottom frame 150. As mentioned above, the counter part 300 is formed at the first and third side surface 153a and 153c facing each other. In more detail, the reflective sheet 122 is stacked on the bottom surface 151, and the lamp 124 is positioned at one edge of the reflective sheet 122. The light guide plate 126 is disposed on the reflective sheet 122 such that the lamp 124 is positioned at a side of the light guide plate 126. The optical sheet 128 is disposed on the light guide plate 128. The protrusion 200 of the optical sheet 128 is inserted into the counter part 300 of the bottom frame 150 such that the movement of the optical sheet 128 is prevented.

Then, the main frame 130 is combined with the bottom frame 150. A plurality of screws (not shown) may be used for combining the main frame 130 and the bottom frame 150. The main frame 150 covers the sides of the backlight unit 120.

The liquid crystal panel 110 is disposed on the optical sheet 128. In this case, the connection member 116, which is connected to the liquid crystal panel 110, is bent such that the printed circuit board 117 is positioned at a rear surface of the bottom frame 150. The top frame 140 is combined with the main frame 130 such that the modulation process is finished. The top frame 140 covers edges of a front surface of the liquid crystal panel 110 and side surfaces of the liquid crystal panel 110.

As mentioned above, the above backlight unit 120 is a side light type. Alternatively, a plurality of lamps may be arranged on substantially an entire surface of the reflective sheet. It may be called as a direct type. The direct type backlight unit does not require the light guide plate 126.

In the LCD device according to the present invention, the movement of the optical sheet is efficiently prevented due to the protrusion of the optical sheet and the counter part of the bottom frame.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a liquid crystal panel;
   a backlight unit disposed under the liquid crystal panel and including a light source and an optical sheet, the optical sheet including a protrusion extending from two opposite sides; and
   a bottom frame under the backlight unit and including a counter part, the counter part including an opening such that the protrusion is inserted into the opening,
   wherein the protrusion includes a first protruding part extending from the sides and a second protruding part extending from the first protruding part.

2. The device according to claim 1, wherein the second protruding part has a width smaller than the first protruding part such that the optical sheet including the first and second protruding parts has a flat topped pyramid shape in a side view.

3. The device according to claim 1, wherein the bottom frame includes a bottom surface and first to fourth side surfaces vertically extending from the bottom surfaces, wherein the counter part is positioned at the first and third side surfaces facing each other.

4. The device according to claim 3, wherein the counter part includes a first vertical part extending from each of the first and third side surfaces to be parallel to the first and second side surfaces, first and second horizontal parts respectively extending from both ends of the first vertical part, and second and third vertical parts respectively extending from the first and second horizontal parts along an upward direction.

5. The device according to claim 4, wherein each of the first and second horizontal parts is substantially parallel to the bottom surface of the bottom frame.

6. The device according to claim 4, wherein each of the second and third vertical parts is substantially parallel to the first vertical part.

7. The device according to 4, wherein a length of each of the first and second horizontal parts is equal to a length of the second protruding part.

8. The device according to claim 4, wherein a height of each of the second and third vertical parts is about 1.2 times of a thickness of the optical sheet.

9. The device according to claim 8, further comprising a main frame covering sides of the backlight unit and including a concave portion corresponding to the counter part such that an end of each of the second and third vertical parts is inserted into the concave portion.

10. The device according to claim 1, further comprising a main frame covering sides of the backlight unit and a top frame covering front edges of the liquid crystal panel, wherein the top frame is combined with the main frame and the bottom frame.

11. The device according to claim 1, wherein the backlight unit further includes a reflective sheet on the bottom frame and a light guide plate on the reflective sheet and at a side of the light source.

* * * * *